United States Patent [19]

Craig et al.

[11] Patent Number: 4,994,537

[45] Date of Patent: Feb. 19, 1991

[54] POLYACRYLATE COPOLYMER, POLYACRYLATE DISPERSION COMPRISING THE POLYACRYLATE COPOLYMER, AND PROCESS FOR PREPARING THE SAME

[75] Inventors: Daniel H. Craig, Hockessin, Del.; Harry J. Goldy, Woodlyn, Pa.

[73] Assignee: Hercules Incorporated, Wilmington, Del.

[21] Appl. No.: 408,821

[22] Filed: Sep. 18, 1989

[51] Int. Cl.$^5$ .............................................. C08F 18/24
[52] U.S. Cl. ..................... 526/273; 526/301; 526/307.7; 526/314; 526/318.4; 526/318.44
[58] Field of Search ............. 524/819; 526/301, 307.7, 526/314, 273, 318.4, 318.44

[56] References Cited

U.S. PATENT DOCUMENTS 4,659,771 4/1987 Craig .................................... 524/700

FOREIGN PATENT DOCUMENTS 0252526 1/1988 European Pat. Off. .
0331011 9/1989 European Pat. Off. .

Primary Examiner—Joseph L. Schofer
Assistant Examiner—Jeffrey T. Smith
Attorney, Agent, or Firm—Mark D. Kuller

[57] ABSTRACT

Acrylate copolymers comprising (a) repeating units derived from at least one acrylic or methacrylic ester and, by weight of the total copolymer, (b) about 0.1 to 3% of repeating units derived from at least one water-soluble monomer possessing conjugated unsaturation and (c) about 0.1 to 3% of repeating units derived from at least one water-soluble allyl monomer; aqueous polyacrylate dispersions comprising such polymers; and a process of preparing the same. Optionally, the copolymers contain other free-radical polymerizable monomers.

17 Claims, No Drawings

POLYACRYLATE COPOLYMER, POLYACRYLATE DISPERSION COMPRISING THE POLYACRYLATE COPOLYMER, AND PROCESS FOR PREPARING THE SAME

This invention relates to an acrylate copolymer, an aqueous polyacrylate dispersion comprising such a polymer and a process for preparing the same. The acrylate copolymer and aqueous polyacrylate dispersion are useful in the manufacture of latex paints, binders for nonwoven materials water-based inks, paper coatings and water-borne adhesives such as pressure-sensitive adhesives.

BACKGROUND OF THE INVENTION

Certain water-soluble allyl containing monomers, such as N-2-(allylcarbamato) aminoethyl imidazolidinone, generally known as wet adhesion monomers, dramatically improve the adhesion of latex polymers to various substances under conditions of high humidity. These monomers impart improved moisture resistance to acrylate copolymers prepared with them. However, they have a tendency to undergo chain transfer and drastically reduce latex polymer chain length (this is shown by, among other things, the high chain transfer constant of the allyl monomers and the low reduced specific viscosity (RSV) of aqueous polyacrylate dispersions comprising acrylate copolymers prepared with such monomers).

U.S. Pat. No. 4,659,771 discloses that stable aqueous polyacrylate dispersions can be prepared in the presence of protective colloids when relatively minor amounts of a substantially completely water-soluble monomer possessing conjugated unsaturation is present. In addition, U.S. patent application No. 06/884,822 now U.S. Pat. No. 4,966,822 and European Patent Application Nos. 252,526 and 331,011 disclose that minor amounts of water-soluble monomers possessing conjugated unsaturation are capable of stabilizing aqueous polyacrylate dispersions by themselves (i.e., in the absence of a protective colloid), either in the presence of or absence of comonomers, including organo-soluble allyl monomers. The RSV, which is indicative of the molecular weight due to carbon chain length (as opposed to weight added due to branching), of acrylate copolymers prepared according to the aforementioned documents is comparable to conventional polyacrylate dispersions.

There is presently a desire for dispersions of polyacrylates having higher molecular weight due to increased carbon chain length and improved moisture resistance, such as that imparted by the aforementioned wet adhesion monomers. It is known that molecular weight of latex polymers may be increased by lowering initiator concentration, lowering reaction temperature, adding multifunctional monomers or performing any combination of these steps. However, each of these steps has undesired side effects, such as slowing the rate of monomer conversion, leading to longer reaction times for the first two methods; and increasing polymer branching, leading to reduced rates of film formation and possible loss of gloss for all three of these methods.

Accordingly, it is an object of this invention to provide acrylate copolymers and aqueous polyacrylate dispersions of improved processability and improved polymer molecular weight (due to longer polymer chain length). In addition, it is an object to provide acrylate copolymers and polyacrylate dispersions of improved film toughness and clarity. Further, it is an object of this invention to prepare acrylate copolymers having moisture resistance such as that imparted by the aforementioned wet adhesion monomers. Other goals and objectives of this invention should be evident to the person of ordinary skill in the art from the above discussion and the following disclosure.

SUMMARY OF THE INVENTION

This invention is directed to acrylate copolymers comprising (a) repeating units derived from at least one acrylic or methacrylic ester and, based on the weight of the total copolymer, (b) about 0.1 to 3% of repeating units derived from at least one water-soluble monomer possessing conjugated unsaturation and (c) about 0.1 to 3% of repeating units derived from at least one water-soluble allyl monomer; aqueous polyacrylate dispersions comprising such polymers; and a process of preparing the same. Optionally, the copolymers contain other free-radical polymerizable monomers.

DETAILED DESCRIPTION OF THE INVENTION

Suitable water-soluble allyl monomers useful in this invention are those allyl containing compounds possessing a solubility of at least 0.5 g per 100 g of water, preferably at least 1.0 g per 100 g of water at 20° C. All such water-soluble allyl monomers possess at least one polar functional group (e.g., ester, ether, urethane, ureido, etc.). Examples of such monomers are allyl alcohol; mono, di, and triallylamine and their corresponding acid salts; alkyl derivatives of mono, di, and triallylamines and their corresponding acid salts. Allyl amides, allyl carbonates, allyl carbamates, mono and diallyl amine adducts of epoxides, etc., are also useful. Further examples include allyl urea, Sipomer WAM (Alcolac, Inc., Baltimore, Md.—described as the allyl derivative of cyclic ureido compound), N-2-(allylcarbamato) aminoethyl imidazolidinone (e.g., WAM IV, Air Products and Chemicals, Inc., Allentown, Pa.).

The substantially completely water-soluble monomers having conjugated unsaturation, i.e., conjugated double or triple bonds, suitable for use in the practice of this invention are described in U.S. patent application No. 06/884,822 and European Patent Application Nos. 252,526 and 331,011. They include furoic acid, the metal salts, amine salts, ammonium salts and quaternary salts of rosin and of carboxylic and sulfonic acids having 4 to 36 carbon atoms, preferably 4 to 24 carbon atoms, and water-soluble derivatives thereof. Such derivatives include the water-soluble amine salts, amides, substituted amides, hydroxyalkyl esters and sulfoalkyl esters, aldehydes and alcohols of said monomers. Suitable substantially completely water-soluble monomers having conjugated unsaturation include the water-soluble amine salts, amides, substituted amides, hydroxyalkyl esters and sulfoalkyl esters of sorbic acid, cinnamic acid, abietic acid, linoleic acid, furylacrylic acid, muconic acid and furoic acid.

The term "substantially completely water-soluble" as used herein means a monomer having conjugated unsaturation which has a solubility of at least 0.4 grams per 100 ml of water, preferably 1.0 grams per 10 ml of water, at room temperature (about 20° C).

Suitable metals for forming metal salts include sodium, potassium, lithium, magnesium, calcium and zinc.

Preferred sulfonic acid monomers having conjugated unsaturation are selected from the group consisting of linear or cyclic, nonaromatic sulfonic acids or sulfonic acid metal salts, amine salts, ammonium salts and quaternary ammonium salts having 4 to 36 carbon atoms. By "cyclic, nonaromatic" it is meant that the conjugated unsaturated moiety is present as part of a cyclic structure and will free radically polymerize in a 1,4 fashion (i.e., the cyclic structure is not a free radically inert structure such as phenyl, imidazolyl, pyrrolyl, etc.). Well known groups are 5 to 8 member rings containing all carbon atoms or one or more hetero atoms (nitrogen, oxygen or sulfur atoms). Preferred are five membered rings having as a fifth atom a carbon, sulfur or oxygen atom, the most preferred of which are cyclopentadienyl, furanyl and thiophenyl.

Exemplary free-radical polymerizable sulfonic acid monomers of this invention are those having the following general formulae:

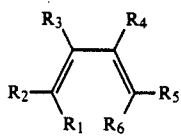
(I)

wherein $R_1$ and $R_6$, and, when present, $R_2$, $R_3$, $R_4$ and $R_5$, are H, —COOH, —COOR$_7$, —SO$_3$M or —R$_8$SO$_3$M, or substituted or unsubstituted alkyl, aryl or alkaryl; at least one of $R_1$, $R_2$, $R_3$, $R_4$, $R_5$ and $R_6$ which is present is —SO$_3$M or —R$_8$SO$_3$M; $R_7$ is substituted or unsubstituted alkyl, aryl, or alkaryl; $R_8$ is substituted or unsubstituted alkylene (e.g., methylene, ethylene, etc.), arylene, aralkylene, alkylarylene, alkyl aryl and aryl alkyl; M is H, a stoichiometric equivalent of a metal ion in an amount sufficient to neutralize the —SO$_3$ charge, or an amine, ammonium or quaternary ammonium group; and one or both of the depicted double bonds may be replaced by a triple bond (in which case $R_2$ and $R_3$, $R_4$ and $R_5$, or $R_{2-5}$ will not be present); or

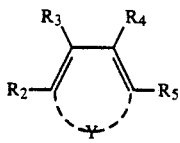
(II)

wherein $R_2$, $R_3$, $R_4$ and $R_5$ are defined above; at least one of $R_2$, $R_3$, $R_4$ and $R_5$ is —SO$_3$M or —R$_8$SO$_3$M; $R_8$ and M are defined above; and y is one more substituted or unsubstituted carbon or hetero atoms forming a 5 to 8 membered ring. Preferably only one of $R_{1-6}$ of formula (I) and $R_{2-5}$ of formula (II) is —SO$_3$M or —R$_8$SO$_3$M.

The allyl monomers and conjugated monomers are readily copolymerized with acrylic esters and methacrylic esters.

Exemplary acrylic and methacrylic esters per this invention include the substituted and unsubstituted alkyl, aryl, alkaryl, etc., esters of acrylic and methacrylic acid. Preferably, the acrylic esters and methacrylic esters used to make improved latices according to the invention are alkyl esters in which the alkyl group contains up to 9 carbon atoms, and most preferably are methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, t-butyl acrylate, t-butyl methacrylate, 3,3-dimethylbutyl acrylate and 3,3-dimethyl butyl methacrylate.

Other alkyl esters of acrylic and methacrylic acid that can be used, containing up to 22 carbon atoms, include decyl acrylate, decyl methacrylate, hendecyl methacrylate, lauryl methacrylate, tridecanyl methacrylate, myristyl acrylate, myristyl methacrylate, pentadecanyl methacrylate, arachidyl methacrylate, behenyl methacrylate, 10-methyl hendecanyl methacrylate and 2-ethyllauryl methacrylate.

The esters of acrylic and methacrylic acid that are suitable for the process according to the invention can be homopolymerized or copolymerized with each other, and can be copolymerized with one or more different comonomers capable of addition type polymerization, including unsubstituted and substituted styrene, acrylic or methacrylic acid, vinyl and vinylene halides, allyl esters of saturated monocarboxylic acids, vinyl esters, vinyl ethers, dialkyl esters of monoethylenically unsaturated dicarboxylic acids, ethylenically unsaturated monocarboxylic and polycarboxylic acids and the anhydrides, nitriles, unsubstituted and substituted (including N-substituted) amides of all the said acids.

An "acrylate copolymer" preferably comprises at least 50%, by weight of the total copolymer, of units derived from acrylic or methacrylic ester monomers. However, free-radically polymerizable comonomer units, if present, can be present in an amount from, by weight of the units derived from acrylic or methacrylic esters and comonomer units (i.e., the units other than components (b) and (c)), about 0.5% to less than 75%, preferably from 0.5% to 50%, most preferably from about 1% to about 10%. Reference to the "weight of the total copolymer" herein means the total weight of the units derived from alkyl esters of acrylic and methacrylic acid, the free-radically polymerizable conjugated monomers and allyl monomers, and all other comonomers. This percentage is proportional to the total monomer percentage used to form the copolymer or dispersion.

The vinyl esters with which the acrylates and methacrylates used in the process according to the invention can be copolymerized include, e.g., aliphatic vinyl esters, such as vinyl formate, vinyl acetate, vinyl propionate, vinyl butyrate, vinyl isobutyrate, vinyl valerate, and vinyl caproate. The allyl esters of saturated monocarboxylic acids include, e.g., allyl acetate, allyl propionate and allyl lactate. Generally, these comonomers are used in amounts ranging up to about 10% by weight of the total monomers. The allyl esters of saturated monocarboxylic acids are generally used in relatively small amounts together with larger amounts of one or more other vinyl comonomers, particularly with aliphatic vinyl esters such as vinyl acetate.

The vinyl ethers with which the acrylates and methacrylates used in the process according to the invention can be copolymerized include methylvinyl ether, ethylvinylether and n-butylvinyl ether and typical vinyl ketones include methylvinyl ketone, ethylvinyl ketone and iso-butylvinyl ketone. The suitable dialkyl esters of monoethylenically unsaturated dicarboxylic acids include diethyl maleate, dibutyl maleate, dioctyl maleate, diisooctyl maleate, dinonyl maleate, diisodecyl maleate, ditridecyl maleate, dipropyl fumarate, dibutyl fumarate, dioctyl fumarate, diisooctyl fumarate, didecyl fumarate, dibutyl itaconate and dioctyl itaconate.

The monoethylenically unsaturated monocarboxylic acids that are suitable for use as comonomers include acrylic acid, methacrylic acid, ethacrylic acid and crotonic acid; monoethylenically unsaturated dicarboxylic acids, such as maleic acid, fumaric acid, itaconic acid and citraconic acid; and monoethylenically unsaturated tricarboxylic acids, such as aconitic acid and the halogen-substituted derivatives, e.g., alpha-chloroacrylic acid, and anhydrides of these acids, such as, e.g., maleic anhydride and citraconic anhydride.

Acrylonitrile, alpha-chloro-acrylonitrile and methacrylonitrile are among the corresponding nitriles of such acids that can be used as comonomers. Suitable amides of such acids include unsubstituted amides such as acrylamide, methacrylamide and other alpha-substituted acrylamides and N-substituted amides obtained by conventional reaction of the amides of the aforementioned mono- and poly-carboxylic acids with an aldehyde, such as formaldehyde. Suitable N-substituted amides include N-methylolacrylamide, N-methylolmethacrylamide, alkylated N-methylolacrylamides and N-methylolmethacrylamides, such as N-methoxymethylacrylamide and N-methoxymethyl-methacrylamide.

Amino compounds that can be used as comonomers include substituted and unsubstituted aminoalkyl acrylates, hydrochloride salts of amino monomers and methacrylates, such as beta-aminoethylacrylate, beta-aminoethylmethacrylate, di-methylaminomethylacrylate, beta-dimethylaminoethylacrylate, dimethylaminomethylmethacrylate. Hydroxycontaining monomers that are suitable include betahydroxyethylacrylate, beta-hydroxypropylacrylate, gamma-hydroxypropylacrylate and beta-hydroxyethylmethacrylate.

Protective colloids can be used in the process of this invention, although their presence is not necessary to achieve the objectives of this invention.

Anionic, cationic, nonionic, and amphoteric surfactants and mixtures thereof, known to the art, may be used in the process of this invention. These surfactants are generally used in emulsion polymerization, but are not necessary to achieve the objectives of this invention.

Any known methods of emulsion polymerization can be used including both semi-batch or continuous, as well as thermal thermal-redox, or adiabatic-redox methods.

Polyacrylate latices produced by the process of this invention are low in viscosity and mechanically stable (shear stable). In addition, the latex polymer molecular weight, as indicated by measurements of reduced specific viscosity (RSV), is significantly increased. Architectural and industrial coatings, i.e., latex paints, formulated with these dispersions exhibit superior gloss and wet adhesion.

Aqueous polyacrylate dispersions prepared according to the process of this invention are also useful in the manufacture of binders for nonwoven materials, water-based inks, paper coatings, and water-borne adhesives such as pressure sensitive adhesives.

The following examples illustrate this invention. All parts and percentages are by weight unless otherwise indicated.

EXAMPLE 1

This example illustrates one embodiment of this invention. A reaction vessel equipped with a stirrer, reflux condenser, thermometer, 3 feed ports, and a water jacket, was charged with 20.3 parts distilled water, 0.5 parts potassium sorbate, and 0.5 parts N-2-(allylcarbamato) aminoethyl imidazolidinone (WAM IV, Air Products) with stirring. The reaction mixture was heated to 85° C via circulating hot water, at which time three separate feeds consisting of: (1) 6 parts distilled water plus 1 part 4% aqueous sodium formaldehyde sulfoxylate, (2) 6 parts distilled water plus 0.1 part t-butyl hydroperoxide (90%), and (3) a pre-emulsion containing 1.6 parts poly(oxy-1,2-ethanediyl),alpha-sulfo-omega-(nonylphenoxy)ammonium salt (Alipal CO-436., GAF Corp., New York, N.Y.), 14 parts distilled water, 50 parts of a mixture of monomers containing by weight 50 parts butyl acrylate, 50 parts methyl methacrylate, and 1.0 part methacrylic acid were metered into the reactor over a period of 3.5, 3.5, and 3.0 hours respectively, while maintaining the temperature at 85° C. Heating was continued for 30 minutes beyond the final addition of initiator, at which time the reactor was cooled and the resulting latex characterized.

Reduced specific viscosity measurements were made by dissolving the latex into N-methyl pyrrolidone to a solids content of 0.25% by weight and measuring the viscosity at constant temperature (25° C) in a capillary viscometer, with comparisons being made to control samples without latex polymers.

EXAMPLE 2

The procedures of Example 1 were repeated except that N-2-(allylcarbamato) aminoethyl imidazolidinone was replaced with 0.2 parts of allylurea and 0.3 parts water.

EXAMPLE 3

The procedures of Example 1 were repeated except that both potassium sorbate and N-2-(allylcarbamato) aminoethyl imidazolidinone were replaced with 0.38 parts sorbic acid, 0.2 parts allylamine (to neutralize and solubilize the sorbic acid as its allylammonium salt), 0.1 part allyl alcohol and 0.32 parts water.

EXAMPLE 4

The procedures of Example 1 were repeated except that N-2-(allyl carbamato) aminoethyl imidazolidinone was replaced with 0.2 g of alloxy-propanediol and 0.3 g water.

EXAMPLE 5

The procedures of Example 2 were repeated except that allylurea was replaced with 0.2 g of diallyl tartardiamide.

EXAMPLE 6

The procedures of Example 3 were repeated except that allyl alcohol was replaced with 0.1 parts water.

EXAMPLE 7

The procedures of Example 1 were repeated except that N-2-(allylcarbamato) aminoethyl imidazolidinone was removed from the initial charge and 1.0 part N-2-(allylcarbamato) aminoethyl imidazolidinone was added to the pre-emulsion.

EXAMPLE 8

The procedures of Example 1 were repeated except that the 14 parts distilled water was added to the initial charge instead of the pre-emulsion.

EXAMPLE 9

The procedures of Example 1 were repeated except that 0.3 parts of hydroxyethylcellulose (HEC), having a 5% aqueous viscosity of 75 centipose at 25° C, and a hydroxyethyl molar substitution (average number of hydroxyethyl groups per anhydroglucose units) of 2.5 was added to the initial reactor charge.

EXAMPLE 10—COMPARISON

The procedures of Example 2 were repeated except that allyl urea was replaced with 0.2 parts water.

EXAMPLE 11—COMPARISON

The procedures of Example 1 were repeated except that potassium sorbate was replaced with 0.5 parts water.

EXAMPLE 12—COMPARISON

The procedures of Example 10 were repeated except that potassium sorbate was replaced with 0.5 parts water.

TABLE 1

| Sample | pH | Solids (wt %) | Aqueous Dispersion Viscosity (cps)[1] | Particle Size (microns)[2] | Reduced Specific Viscosity (dl/g) |
|---|---|---|---|---|---|
| Example 1[3] | 6.8 | 52 | 14–17 | 0.28–0.30 | 0.39–0.47 |
| Example 2 | 7.1 | 52 | 16 | 0.30 | 0.36 |
| Example 3 | 6.5 | 52 | 10 | 0.25 | 0.40 |
| Example 4 | 6.9 | 52 | 22 | 0.32 | 0.38 |
| Example 5 | 6.6 | 52 | 21 | 0.31 | 0.40 |
| Example 6 | 6.5 | 52 | 11 | 0.28 | 0.36 |
| Example 7 | 6.9 | 52 | 14 | 0.33 | 0.49 |
| Example 8 | 6.6 | 52 | 15 | 0.27 | 0.45 |
| Example 9[3] | 6.9 | 52 | 240–270 | 0.45–0.52 | 0.42–0.46 |
| Example 10 | 7.0 | 52 | 17 | 0.25 | 0.32 |
| Example 11 | 4.6 | 52 | 16 | 0.37 | 0.12 |
| Example 12 | 2.6 | 52 | 13 | 0.37 | 0.20 |

[1]Brookfield LVT Viscometer, 30 rpm
[2]Coulter Nanosizer
[3]Represents range of values obtained from several trials.

From the data in Table 1, it can be seen that latex polymer molecular weights imparted due to increased chain length, as assessed by RSV values, are significantly higher for latexes manufactured in the presence of both a water-soluble allyl monomer and a water-soluble conjugated unsaturated monomer, versus latexes manufactured in the presence of either water-soluble allyl monomer (Example 10) or water-soluble conjugated unsaturated monomers alone (Example 11), or latexes manufactured in the absence of both components (Example 12).

While the invention has been described with respect to specific embodiments, it should be understood that they are not intended to be limiting and that many variations and modifications are possible without departing from the scope of this invention.

We claim:

1. An acrylate copolymer comprising (a) repeating units derived from at least one monomer selected from the group consisting of acrylic and methacrylic esters and, based on the weight of the total copolymer, (b) about 0.1 to 3% of repeating units derived from at least one water-soluble monomer possessing conjugated unsaturation and (c) about 0.1 to 3% of at least one repeating unit derived from a water-soluble allyl monomer having a solubility of at least 0.5 g in 100 g of water at 20° C selected from the group consisting of allyl alcohol; mono, di, and triallylamine and acid salts thereof; alkyl derivatives of mono, di, and triallylamines and acid salts thereof; allyl amides; allyl carbonates; allyl carbamates; mono and diallyl amine adducts of epoxides; allyl urea; and N-2-(allylcarbamato) aminoethyl imidazolidinone.

2. The acrylate copolymer of claim 1 wherein the water-soluble allyl monomer has a solubility of at least 1.0 g in 100 g of water at 20° C.

3. The acrylate copolymer of claim 1 wherein the water-soluble allyl monomer is selected from the group consisting of allyl alcohol; mono, di, and triallylamine and acid salts thereof; and alkyl derivatives of mono, di, and triallylamines and acid salts thereof.

4. The acrylate copolymer of claim 1 wherein the water-soluble allyl monomer is selected from the group consisting of allyl amides, allyl carbonates, allyl carbamates, and mono and diallyl amine adducts of epoxides.

5. The acrylate copolymer of claim 1 wherein the water-soluble allyl monomer is selected from the group consisting of allyl urea and N-2-(allylcarbamato) aminoethyl imidazolidinone.

6. The acrylate copolymer of claim 1 wherein the substantially completely water-soluble monomer having conjugated unsaturation is selected from the group consisting of furoic acid, the metal salts, amine salts, ammonium salts and quaternary salts of rosin and of carboxylic and sulfonic acids having 4 to 36 carbon atoms and water-soluble derivatives thereof.

7. The acrylate copolymer of claim 1 wherein the substantially completely water-soluble monomer having conjugated unsaturation is selected from the group consisting of the water-soluble amine salts, amides, substituted amides, hydroxyalkyl esters and sulfoalkyl esters of sorbic acid, cinnamic acid, abietic acid, linoleic acid, furylacrylic acid, muconic acid and furoic acid.

8. The acrylate copolymer of claim 1 wherein the substantially completely water-soluble monomer having conjugated unsaturation has a solubility of at least 0.4 grams per 100 ml of water at 20° C.

9. The acrylate copolymer of claim 1 wherein the substantially completely water-soluble monomer having conjugated unsaturation has a solubility of at least 0.4 grams per 100 ml of water at 20° C.

10. The acrylate copolymer of claim 2 wherein the substantially completely water-soluble monomer having conjugated unsaturation has a solubility of at least 1.0 grams per 10 ml of water at about 20° C.

11. The acrylate copolymer of claim 6 wherein the substantially completely water-soluble monomers are metal salts wherein the metal is selected from the group consisting of sodium, potassium, lithium, magnesium, calcium and zinc.

12. The acrylate copolymer of claim 1 wherein the acrylic and methacrylic esters are selected from substituted and unsubstituted alkyl, aryl and alkaryl esters of acrylic and methacrylic acid in which the alkyl group contains up to 22 carbon atoms.

13. The acrylate copolymer of claim 1 wherein the acrylic and methacrylic esters are selected from substituted and unsubstituted alkyl, aryl and alkaryl esters of acrylic and methacrylic acid in which the alkyl group contains up to 9 carbon atoms.

14. The acrylate copolymer as claimed in claim 1, further comprising about 0.5% to less than 75% of at least one free-radically polymerizable comonomer derived unit, by weight of the units derived from acrylic ester monomer, methacrylic ester monomer and free-radically polymerizable comonomer.

15. The acrylate copolymer as claimed in claim 14 wherein the at least one free-radically polymerizable comonomer is selected from the group consisting of unsubstituted and substituted styrene, acrylic or methacrylic acid, vinyl and vinylene halides, allyl esters of saturated monocarboxylic acids, vinyl esters, vinyl ethers, dialkyl esters of monoethylenically unsaturated dicarboxylic acids, ethylenically unsaturated monocarboxylic and polycarboxylic acids and the anhydrides, nitriles, unsubstituted and substituted amides of all the said acids.

16. The acrylate copolymer as claimed in claim 1, further comprising 0.5 to 50% of at least one free-radically polymerizable comonomer derived unit, by weight of the units derived from acrylic ester monomer, methacrylic ester monomer and free-radically polymerizable comonomer.

17. The acrylate copolymer as claimed in claim 1, further comprising 1 to 10% of at least one free-radically polymerizable comonomer derived unit, by weight of the units derived from acrylic ester monomer, methacrylic ester monomer and free-radically polymerizable comonomer.

* * * * *

UNITED STATES PATENT AND TRADEMARK OFFICE
CERTIFICATE OF CORRECTION

PATENT NO.  : 4,994,537

DATED       : February 19, 1991

INVENTOR(S) : Daniel H. Craig and Harry J. Goldy

It is certified that error appears in the above-identified patent and that said Letters Patent is hereby corrected as shown below:

Col. 3, line 54, "conJugated" should read -- conjugated --;

Col. 5, line 30, "Hydroxycontaining" should read -- Hydroxy-containing --;

Col. 5, line 31, " betahydroxyethylacrylate" should read -- beta-hydroxyethylacrylate --;

Signed and Sealed this

Twenty-fourth Day of November, 1992

Attest:

DOUGLAS B. COMER

*Attesting Officer*   Acting Commissioner of Patents and Trademarks